United States Patent [19]

Kwasniewski

[11] Patent Number: 5,302,158
[45] Date of Patent: Apr. 12, 1994

[54] LUBRICANT PUMPING IN TANDEM DRIVE AXLES

[75] Inventor: Dale L. Kwasniewski, Kalamazoo, Mich.

[73] Assignee: Eaton Corporation, Cleveland, Ohio

[21] Appl. No.: 982,170

[22] Filed: Nov. 24, 1992

[51] Int. Cl.⁵ .................................................. F16H 57/04
[52] U.S. Cl. .................................... 475/160; 74/467
[58] Field of Search .................... 475/159, 160; 74/467

[56] References Cited

U.S. PATENT DOCUMENTS

| 2,949,792 | 8/1960 | Smith | 74/711 |
|---|---|---|---|
| 3,015,970 | 1/1962 | Mueller | 74/711 |
| 3,040,600 | 6/1962 | Mueller | 74/711 |
| 3,229,550 | 1/1966 | Nickell | 74/711 |
| 4,012,968 | 3/1977 | Kelbel | 74/711 |
| 4,730,514 | 3/1988 | Shikata et al. | 475/160 |

FOREIGN PATENT DOCUMENTS

| 214082 | 4/1958 | Australia | 475/160 |
|---|---|---|---|
| 373495 | 6/1990 | European Pat. Off. | 74/467 |
| 1-112052 | 4/1989 | Japan | 475/160 |
| 2-248756 | 10/1990 | Japan | 475/160 |
| 2-286956 | 11/1990 | Japan | 74/467 |
| 759348 | 8/1980 | U.S.S.R. | 74/467 |

OTHER PUBLICATIONS

Product Literature entitled "Eaton" Single Reduction and Tandem Drive Axles.

Primary Examiner—Leslie A. Braun
Assistant Examiner—Ryan W. Massey
Attorney, Agent, or Firm—R. A. Johnston

[57] ABSTRACT

A lubricant pump of the gerotor type is mounted concentrically over the output shaft of the leading axle in a tandem drive axle arrangement having in inter-axle power dividing differential. The outer rotor of the pump is connected by an annular drive band to the differential carrier to assure full time pump operation. Passages are provided for flow through an externally mounted filter.

13 Claims, 5 Drawing Sheets

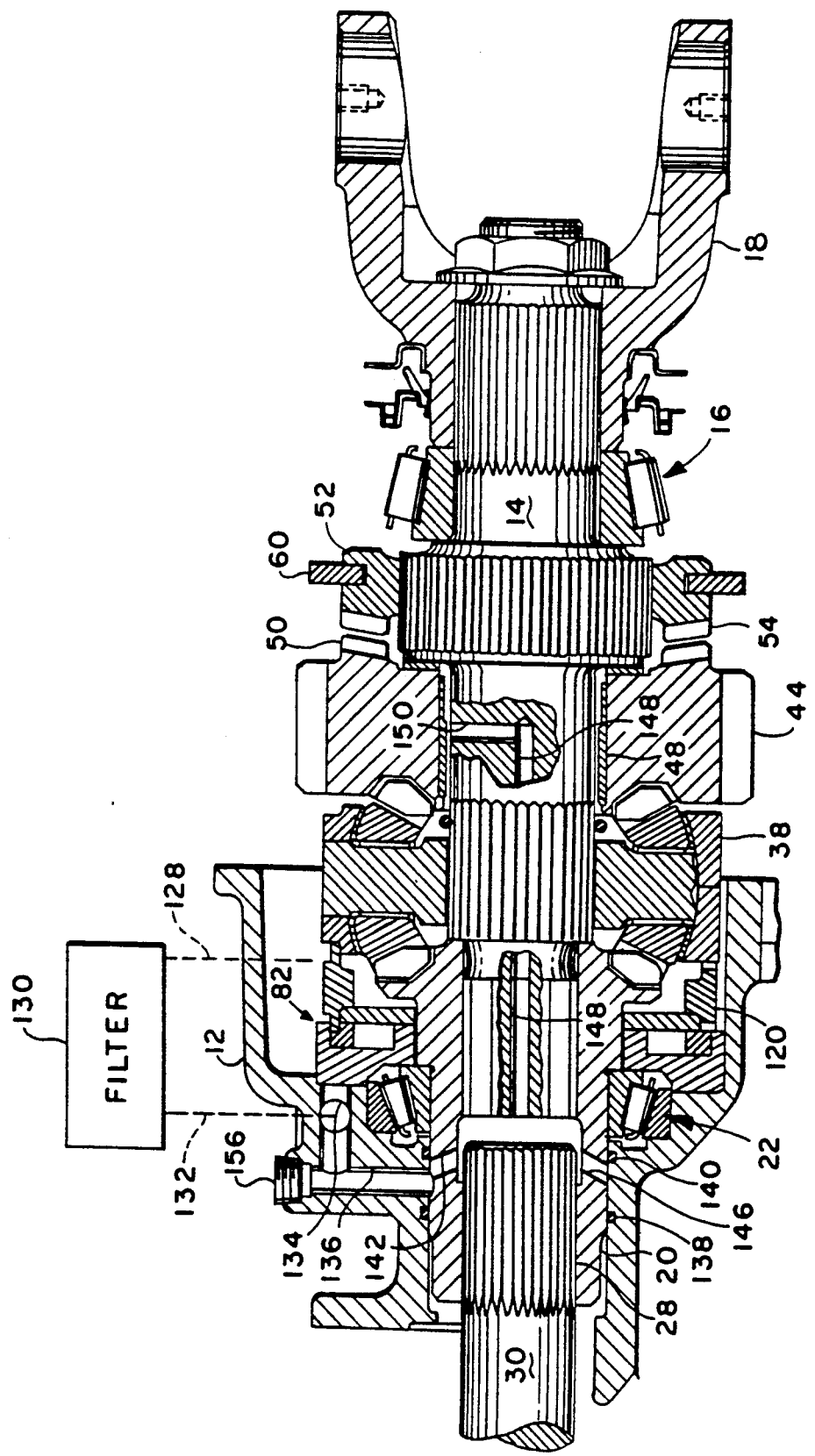

LUBRICANT PUMPING IN TANDEM DRIVE AXLES

BACKGROUND OF THE DISCLOSURE

The present invention relates to drive axles and particularly drive axles arranged in tandem to receive power from a common power input or propeller shaft, and with a power divider for providing shared power from the propeller shaft to the tandem drive axles. In particular, the invention relates to tandem drive axles operating from a common propeller shaft and employing a power divider comprising an in inter-axle differential. Tandem drive axles having an inter-axle differential are widely used in heavy duty trucks for on- and off-road service. Furthermore, it is known to employ an inter-axle differential in tandem drive axles with a shiftable mechanism for locking the inter-axle differential to provide positive drive to the leading and trailing tandem axles.

In such drive axles it is common to have a supply of lubricant in the housing and to provide positive lubricant pressure to the input and output shaft journals and the inter-axle differential which are disposed above the level of lubricant in the housing.

Heretofore, a gear driven lubricant has been employed which has been driven through an idler gear from the input shaft and which directed a spray to the inter-axle differential.

Thus it has been desired to provide a low-cost and convenient way to incorporate a lubricant pump for providing positive flow of lubricant to the input and output shaft journals in the driving axles.

SUMMARY OF THE INVENTION

The present invention provides a lubricant pump within the housing of a leading tandem driving axle. The pump is of the gerotor type with the housing mounted concentrically about the power shaft on the output side of an inter-axle differential with the rotating element of the gerotor pump driven by an annular member having axially extending lugs engaging the carrier of the inter-axle differential. The pump is thus driven irrespective of whether the inter-axle differential is locked or free to divide power as between the leading tandem axle countergear and the output shaft to the trailing tandem axle. The lubricant pump of the present invention is thus conveniently installed in a leading tandem drive axle with a minimum of modification to the axle and provides a positive pressurized source of lubricant flow for lubricating the drive axles. The lubricant pump installation of the present invention provides a convenient pump construction which is disposed concentrically over the output shaft of the inter-axle differential and is conveniently driven by a coupling connected to the carrier of the inter-axle differential.

The pump output is circulated through a filter external to the axle housing and re-enters through a gallery communicating with passages in the input and output shafts which supply lubricant to the journals for these shafts and to the inter-axle differential assembly.

DETAILED DESCRIPTION

Figure 1:
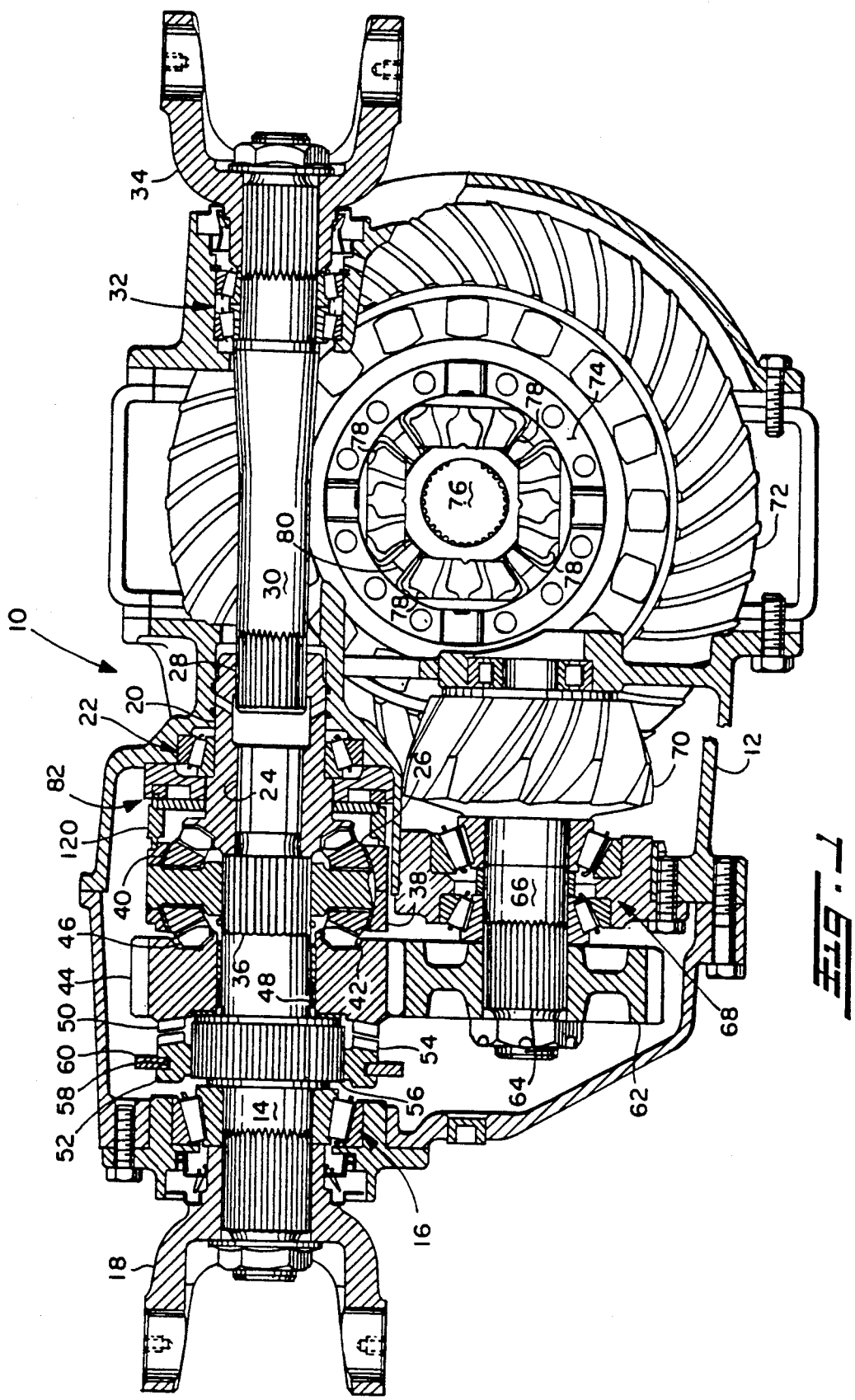
FIG. 1 is a cross-section of a leading tandem drive axle taken vertically through the axis of the input shaft.

Referring to FIG. 1, the invention is illustrated as embodied in the leading one of a plurality of tandem drive axles indicated generally at 10, and which has a casing or housing 12. A power input shaft 14 is journalled in a bearing assembly indicated generally at 16, and has a yoke 18 attached thereto, which is adapted for receiving power from the vehicle driveline.

A power output sleeve or coupling 20 is journalled in a second bearing assembly indicated generally at 22, and has a reduced diameter pilot portion 24 of input shaft 14 journalled therein as denoted by reference numeral 24. Output sleeve 20 has a plurality of sidegear teeth 26 formed thereon for receiving driving power. The end of power output coupling 20 has received therein and engaged by a plurality of splines 28 provided at one end of an output shaft 30, which has the tail end thereof journalled in a dual race bearing assembly indicated generally at 32. The output end of shaft 30 has splined thereto an output yoke 34 adapted for connection to the input shaft of the trailing drive axle (not shown) of the tandem arrangement.

Input shaft 14 has a plurality of splined teeth 36 formed thereon adjacent the pilot 24; and, a differential carrier or spider 38 is received thereover and splined thereto in driving engagement, and has oppositely disposed differential or spider gears 40,42 mounted thereon in free rotating arrangement, and engaging the teeth 26 of the output gear on one side thereof.

A power transfer helical gear 44 is received over shaft 14 and disposed adjacent the spider gears 40,42; and, helical gear 44 has a plurality of side teeth 46 thereon which engage the differential spider gears 40,42. The helical gear 44 is journalled on shaft 14 by a sleeve bearing or bushing 48 for free rotation thereon. Helical gear 44 has on the input axial face thereof a plurality of clutch teeth 50. A clutch ring 52 is received over an enlarged diameter spline 54 formed on shaft 14, the clutch ring having a corresponding set of clutch-dog teeth 56 formed thereon for sliding engagement with the dog teeth 50 on helical gear 44. Clutch ring 52 has a peripheral groove 58 formed thereon by the shift fork end 60 for moving the ring 52 axially on spline 56 for engagement and disengagement of the helical gear 44 with shaft 14. It will be understood that when the ring 52 engages the dog-teeth 50 on helical gear 44 relative rotation of the helical gear and shaft 14 is prevented and the differential mechanism is thus in a locked condition.

Helical gear 44 is engaged with a countergear 62, which is received over and drivingly engaged with splines 64 provided on a pinion shaft 66 which is journalled in housing 12 by means of the dual bearing assembly indicated generally at 68. Pinion shaft 66 has formed integrally therewith a drive pinion 70 which engages the axle ring gear 72, which is bolted to a second differential carrier 74 which drives the axle 76 by means of differential gears 78 and side gear 80.

Figure 2:
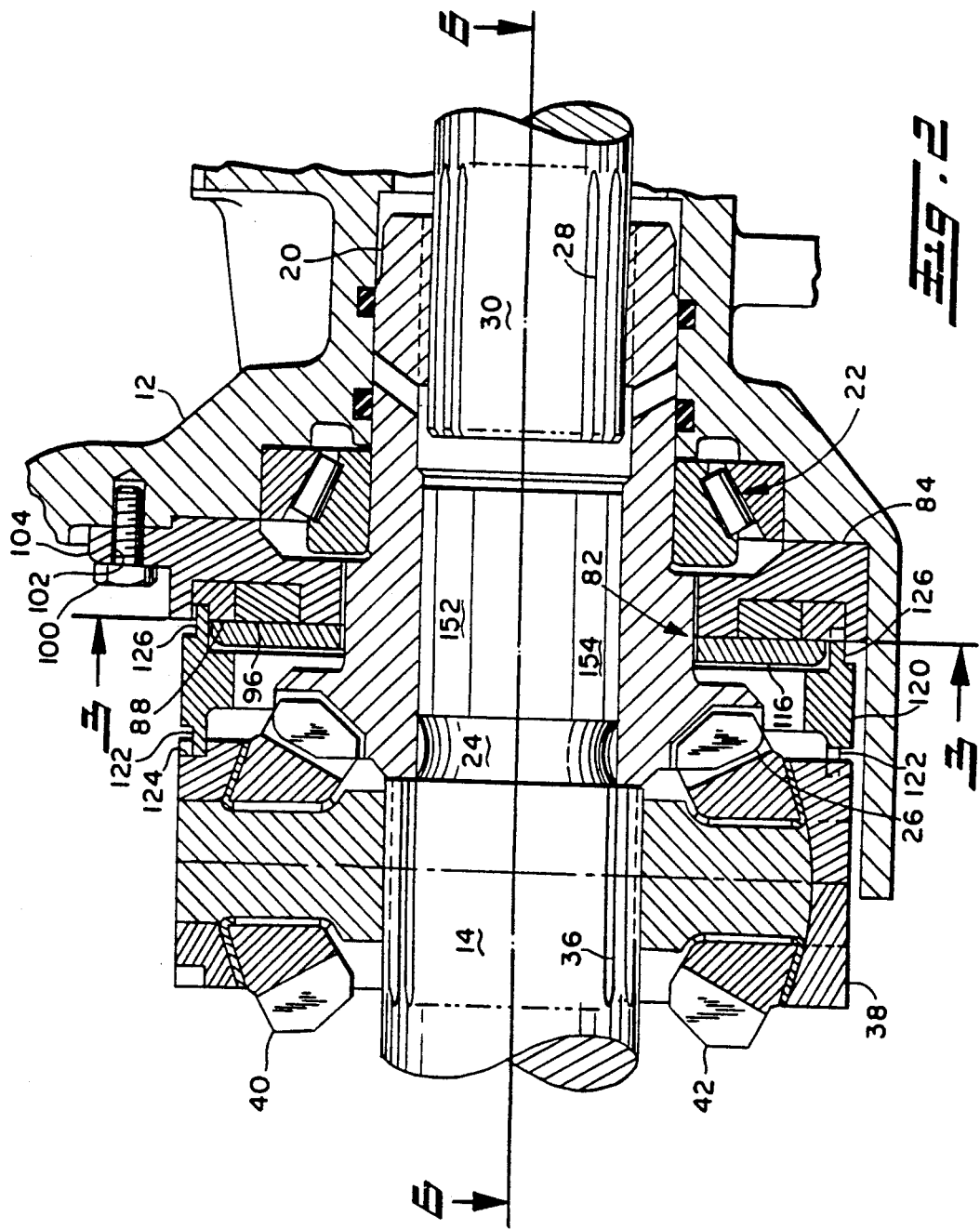
FIG. 2 is an enlarged view of a portion of FIG. 1 showing the inter-axle differential and pump in greater detail.
Figure 3:
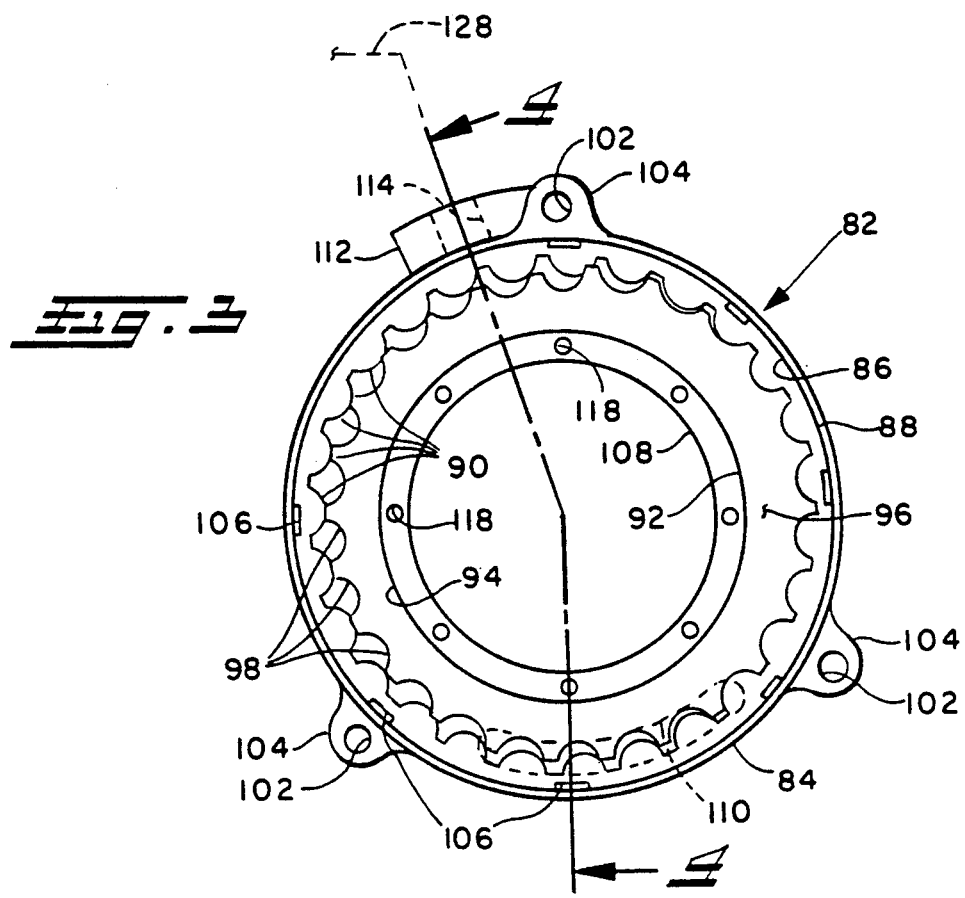
FIG. 3 is a section view taken along section indicating lines 3—3 of FIG. 2.
Figure 4:
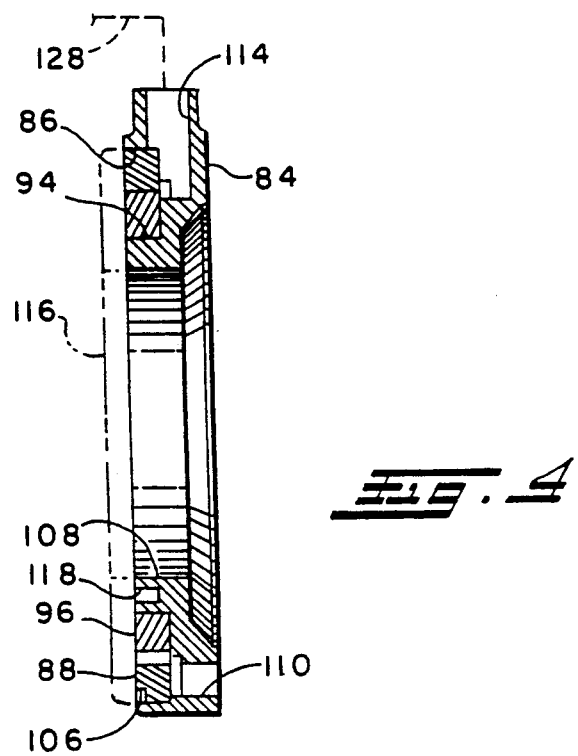
FIG. 4 is a section view taken along section indicating lines 4—4 of FIG. 3.
Figure 5:
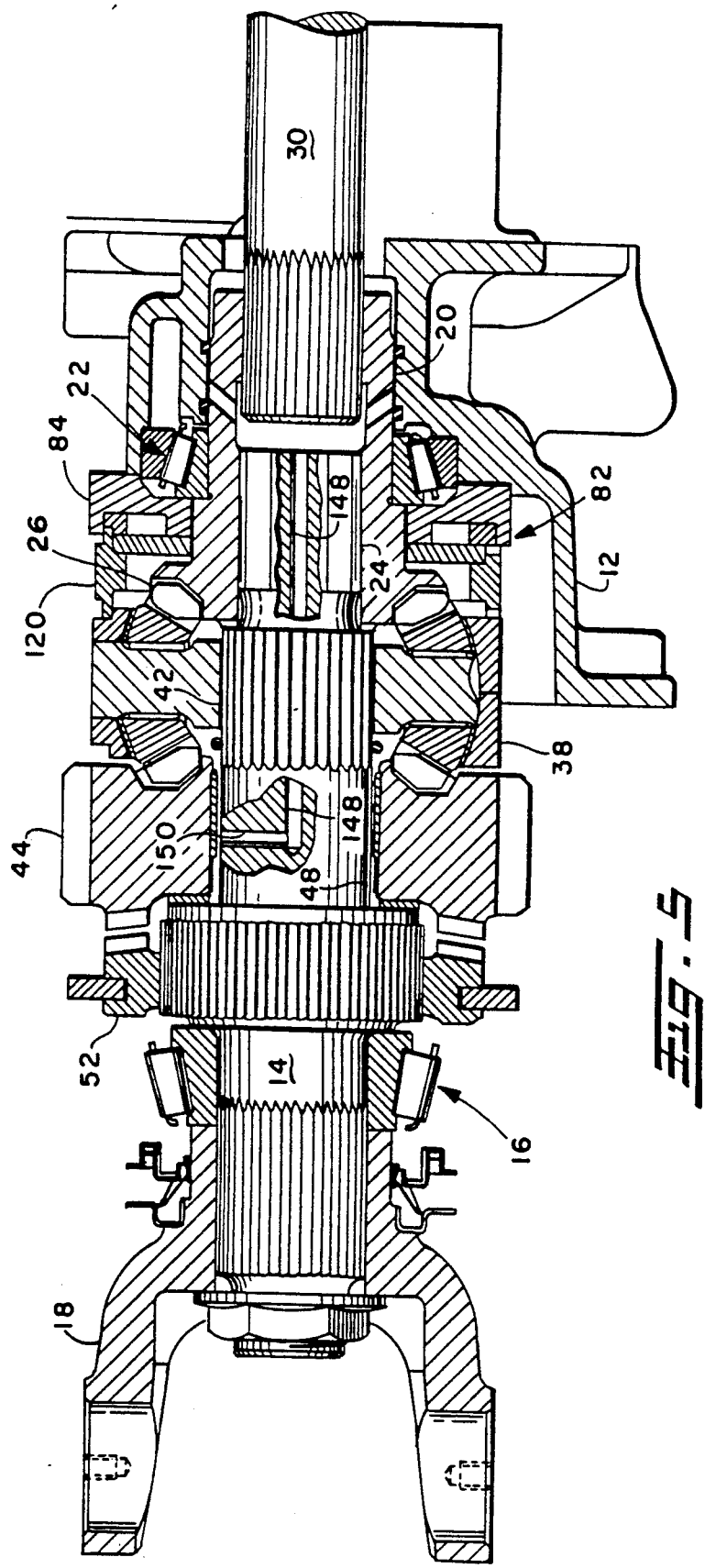
FIG. 5 is a cross-section of a portion of a leading tandem driven axle employing the present invention taken horizontally through the axis of the input shaft; and, FIG. 6 is a cross-section taken along section indicating line 6—6 of FIG. 2.

Referring to FIGS. 2, 3, and 4, a pump assembly indicated generally at 82 has a stator in the form of a casing 84, which has formed therein an outer cylindrical internal surface 86 in which is journalled an outer rotor member 88 for precision fit free rotation therein. The inner periphery of the outer rotor member 88 has a plurality of internally-extending teeth or lobes disposed in circumferentially equally spaced arrangement as denoted typically by reference numeral 90 in FIG. 3. Stator 84 has a second cylindrical surface formed thereon and spaced radially inwardly from the outer surface 86 and denoted by reference numeral 94 in FIGS. 3 and 4. The cylindrical surface 94 is disposed about an axis displaced from the axis of the cylindrical surface 86 by a desired amount to thereby make the surfaces 94 and 86 eccentric with respect to each other.

An inner rotor 96 has the outer periphery thereof provided with a plurality of circumferentially spaced radially-outwardly extending teeth or lobes, as denoted typically by reference numeral 98 in FIG. 3. It will be understood that the external lobes 98 are configured so as to be capable of interdigitation with the lobes 90 upon rotation of the inner ring 96 about the surface 94 upon which it is journalled in a precision free-sliding arrangement.

Referring to FIGS. 2, 3, and 4, the pump assembly 82 is shown installed in the axle housing 12 by bolts or screws 100 received through apertures 102 provided in lugs 104 provided on the pump stator 84 in circumferentially spaced arrangement. The outer periphery of the outer rotor ring 88 has a plurality of circumferentially equally spaced recesses or notches denoted typically by reference numeral 106 in FIG. 3, which are adapted for driving engagement, as will hereinafter be described in detail. It will be understood that the stator has a central bore 108 with a clearance hole for the drive coupling 20 which is received therethrough upon installation of the pump assembly 82 in housing 12. The stator also has an inlet slot 110 provided therein which communicates with the face of the rotors 88,96 on the side thereof adjacent the housing 12. The stator 84 has an outwardly-extending boss 112 provided thereon as shown in FIGS. 3 and 4, which boss has formed therein an outlet or discharge port 114 which also communicates with the side of the inner rotor 96 and outer rotor 88 for discharging fluid upon rotation of the inner and outer rotors. A cover or annular cap 116 is secured over the rotors onto the stator by screws (not shown) engaging a plurality of circumferentially spaced holes 118 provided in the stator. The cover is removed in FIG. 3, illustrated in solid outline in FIGS. 1 and 2, and shown in dashed outline in FIG. 4.

Referring to FIGS. 1 and 2, a drive coupling in the form of annular band 120 has a plurality of circumferentially-spaced and axially-extending lugs 122 which each engage, respectively, one of a plurality of notches 124 formed in the axial face of the differential carrier 38.

Similarly, a plurality of circumferentially-spaced axially-extending lugs 126 are formed on the axially opposite face or side of the band 120; and, each of the lugs 126 is engaged with one of the notches 106 (see FIG. 3) in the outer rotor 88 of the pump.

Thus, the annular band 120 transmits rotary power from the differential carrier 38 directly to the outer rotor 88 of the pump.

Referring to FIGS. 1, 3, 4, and 6, the outlet of the pump 114 is connected externally of the casing 12 via the fluid conduit 128 indicated in dashed outline in FIG. 6 to a filter 130; and, the filtered lubricant is returned to the casings through conduit 132, also shown in dashed outline, which is connected to an inlet passage 134 provided in casing 12. Passage 134 communicates with a vertical passage 136 which is ported to the outer diameter of coupling 20 between seal rings 138, 140. A plurality of cross passages 142, 146 formed in coupling 20 communicate lubricant to the interior thereof.

Lubricant under pressure flows from the interior of coupling 20 through central passage 148 in pilot portion 24 and shaft 14 to cross hole 150 which supplies sleeve bearing 48. Lubricant under pressure flows axially through sleeve bearing 48 and lubricates the spider gears 40, 42 on the power dividing differential and the clutch on gear 44.

Referring to FIG. 2, if desired, pilot portion 24 of input shaft 14 may have a plurality of flats 152, 154 formed thereon to facilitate oil flow to output gear 26. It will be understood that the inlet port or slot 110 in pump stator 84 is immersed below the lubricant fill level in casing 12 in order to provide a continuous supply to the pump 82. If desired, filter 130 may be mounted directly on the exterior of casing 12, in which case conduits 128, 132 would comprise holes in the casing spaced to communicate directly with the filter inlet and outlet. In the present practice, vertical oil passage 136 is bored from the exterior of the casing and sealed with a threaded plug 156.

The present invention thus provides a unique and low cost means for lubricating the input and output shaft of tandem drive axles with an inter-axle power dividing differential. A gerotor pump is mounted concentrically over the output shaft of the leading axle. The outer rotor is connected via an annular drive band to the inter-axle differential carrier to insure full time pump operation. Lubricant galleries are provided for flow to and from an external filter.

Although the present invention has been described with respect to the illustrated embodiments, it will be understood that the invention is capable of modification and variation, and is limited only by the following claims.

I claim:

1. In combination with tandem drive axles having a power divider therebetween, the improvement comprising:

(a) a housing means having a supply of lubricant therein;

(b) a power input shaft for one of said axles and a power output shaft having a gear thereon for the other of said tandem axles and a power divider comprising an inter-axle differential having the spider or carrier thereof drivingly connected to said input shaft and carrier mounted differential or idler gears meshing with said output shaft gear and a drive gear for said one axle;

(c) pump means having a stator mounted to said housing means and a rotor means operative upon rotation with respect to said stator to circulate said lubricant for lubricating said input and output shafts and said power divider; and, (d) coupling means drivingly connecting said carrier to said rotor means.

2. The improvement defined in claim 1, wherein said pump rotary member is drivingly connected to said carrier by an annular member.

3. In combination with tandem drive axles having a power divider therebetween, the improvement comprising:
(a) housing means having one of said tandem axles journalled thereon and containing a supply of lubricant;
(b) a power input shaft journalled on said housing means and adapted for driving one of said tandem axles;
(c) a power output shaft journalled on said housing means, and adapted for driving another of said tandem axles;
(d) a power divider having an input member drivingly attached to said input shaft and an output member drivingly attached to said output shaft and power dividing means carried by said input member and operatively connected to provide divided power to said first tandem axle and said output member;
(e) lubricant pump means including a stator mounted on said housing and including a rotor, rotatable with respect to said stator for pumping said lubricant between an input and an outlet in said stator; and,
(f) a drive coupling interconnecting said power divider input member and said pump rotor for effecting rotation thereof.

4. The improvement defined in claim 3, wherein said power divider comprises an inter-axle differential and said input means comprises a differential gear carrier.

5. The improvement defined in claim 3, wherein said pump means comprises a gerotor pump.

6. The improvement defined in claim 3, wherein said drive coupling comprises an annular member.

7. The improvement defined in claim 3, wherein said power divider comprises an inter-axle differential, said input member comprises a differential gear carrier, and said drive coupling comprises an annular member connected to said carrier.

8. The improvement defined in claim 3, wherein said rotary member is mounted for concentric rotation with said power input shaft.

9. The improvement defined in claim 3, wherein said power dividing means includes pair of oppositely disposed spider gears mounted for free rotation of said power input shaft; and, said spider gears engage a drive gear mounted for free rotation about said power input shaft and drivingly inter-connected to said first tandem axle.

10. The improvement defined in claim 3, wherein said pump means is disposed axially intermediate said power input shaft and said power output shaft.

11. The improvement defined in claim 3, wherein said pump means comprises a gerotor pump having a rotatable outer annular member drivingly connected to said power divider input member and having an inner annular member disposed for eccentric rotation with respect to said housing means.

12. The improvement defined in claim 3, wherein said drive coupling includes an annular member having at least one lug extending therefrom and engaging a corresponding at least one recess provided on said power divider input member.

13. The improvement defined in claim 3, wherein said drive coupling includes an annular member having at least one lug extending therefrom and engaging a corresponding at least one recess formed on said pump means rotatable input member.

* * * * *